Figure 1:
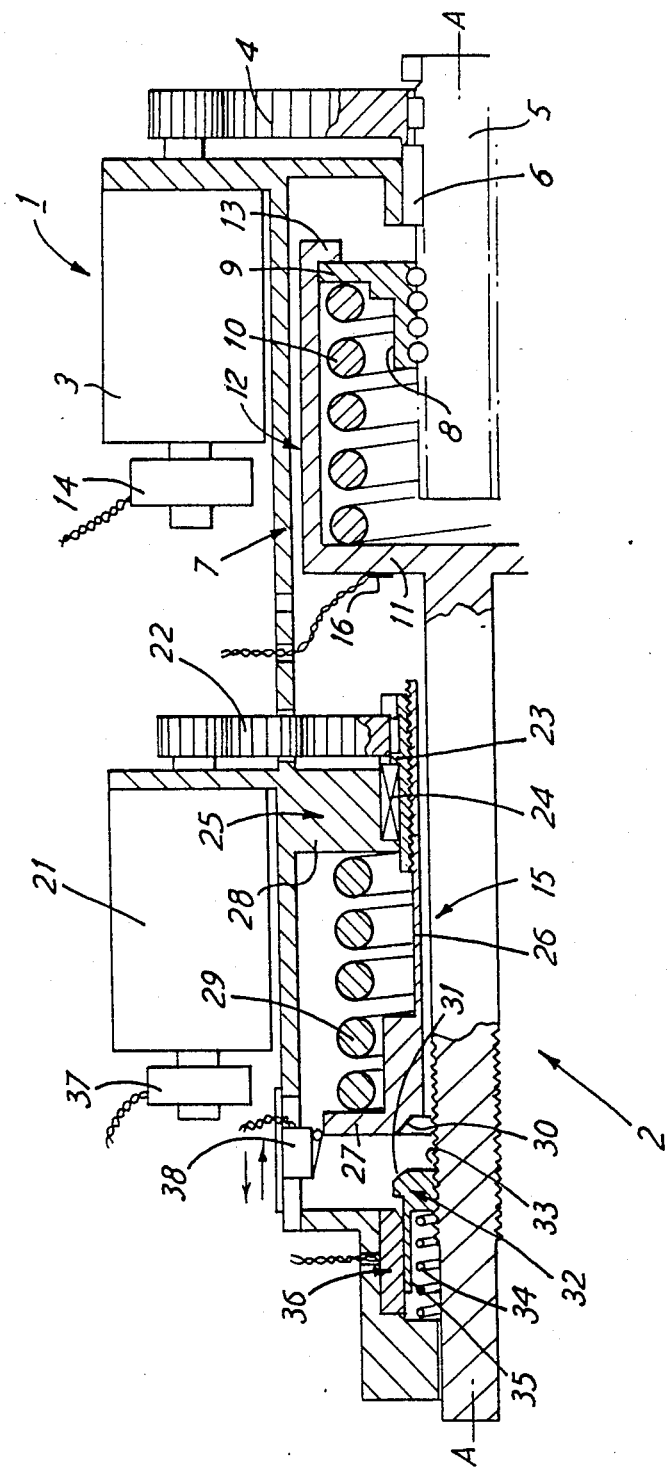

United States Patent [19]

Washbourn

[11] Patent Number: 4,589,531

[45] Date of Patent: May 20, 1986

[54] FORCE APPLYING SYSTEM COMBINING DIRECT AND SPRING-APPLIED ELECTRIC ACTUATORS

[75] Inventor: Jack Washbourn, Chippenham, England

[73] Assignee: Westinghouse Brake and Signal, Wiltshire, England

[21] Appl. No.: 607,660

[22] Filed: May 7, 1984

[30] Foreign Application Priority Data

Mar. 20, 1984 [GB] United Kingdom ............... 8407178

[51] Int. Cl.$^4$ ............................................. B60K 41/20
[52] U.S. Cl. ..................................... 192/2; 188/72.2; 74/89.15
[58] Field of Search ............... 192/1, 2, 94; 188/162, 188/106 R, 72.2, 72.7, 72.1; 303/9; 74/424.8 R, 89.15

[56] References Cited

U.S. PATENT DOCUMENTS 2,491,759 12/1949 Olcott ................................... 192/2
3,604,540 9/1971 Falcone ............................... 188/162
3,937,295 2/1976 Wright ............................ 74/424.8 R Primary Examiner—George H. Krizmanich
Attorney, Agent, or Firm—Larson and Taylor

[57] ABSTRACT

A force-applying system is provided which combines a first direct electric actuator and a second, electrically controlled spring-applied actuator. The output force-applying member of the second actuator is operable through a force-transfer device one member of which is operatively loaded by the force-applying spring of the second actuator and another member of which is controlled by a solenoid. The operation is such that when the solenoid is energized, the members are out of engagement and when the solenoid is de-energized, the two members are engaged so as to operatively connect the spring to the output member. The solenoid and the electric motor of the direct actuator are controlled through an electrical circuit which ensures that the electric motor of the direct actuator is de-energized when the solenoid is de-energized.

7 Claims, 2 Drawing Figures

FORCE APPLYING SYSTEM COMBINING DIRECT AND SPRING-APPLIED ELECTRIC ACTUATORS

This invention relates to force-applying systems and, more particularly, to such systems comprising a first direct electric actuator and a second electrically-controlled spring-applied actuator. Such actuators, of themselves, are well-known.

A direct electric actuator comprises an output-force applying member which is driven by an electric motor firstly to engage and thereafter to apply a force.

An electrically-controlled spring-applied actuator comprises an output force-applying member but, in this case, the engagement and subsequent application of a force to some other part is effected by a force-applying spring which, in the released condition of the actuator, is held off from causing the output member to apply a force by an electric motor of the actuator being operated to hold compressed the force-applying spring.

Such force-applying systems are used in railway braking systems, for example. In such brake systems, in some circumstances it is desirable that the system shall include both types of actuator. For example, a direct electric actuator may be required to effect "service braking" whilst an electrically-controlled spring-applied actuator may be required to effect "emergency braking". However, merely to combine these two actuators presents a problem. Emergency braking may be required whilst service braking is being effected. If, therefore, the electrically-controlled spring-applied actuator were to be operated whilst the direct electric actuator was operative, over-braking would be effected. This could result in a dangerous situation.

The present invention seeks to obviate this problem by providing a force-applying system comprising a first direct electric actuator and a second electrically-controlled spring-applied actuator wherein the output force-applying member of the second actuator is operable through a force transfer device one member of which is operatively loaded by the force-applying spring of the second actuator and the other member of which is controlled by a solenoid such that when the solenoid is energised said other member is held out of engagement with said one member and when the solenoid is de-energised the two force transfer members are engaged operatively to connect the spring to the output member, the solenoid and the electric motor of the first actuator being controlled through an electrical circuit which ensures that the electric motor of the first actuator is de-energised whilst the solenoid is de-energised.

The output force-applying member may be the sole force-applying member of the system and be common to both actuators to provide the output force-applying member of each actuator. In this case, the two actuators may be mounted in tandem and the common output force-applying member may be a shaft which passes from the first actuator through the second actuator.

The force transfer device may be in the form of two complementary conical surfaces of which one is carried by said one member and the other by said other member which may then be a nut threadedly engaged on the output member and loaded by a spring urging the nut in the direction of said one member to engage the two surfaces; the solenoid when energised holding the nut against the action of its spring from interengaging the two surfaces.

Figure 2:
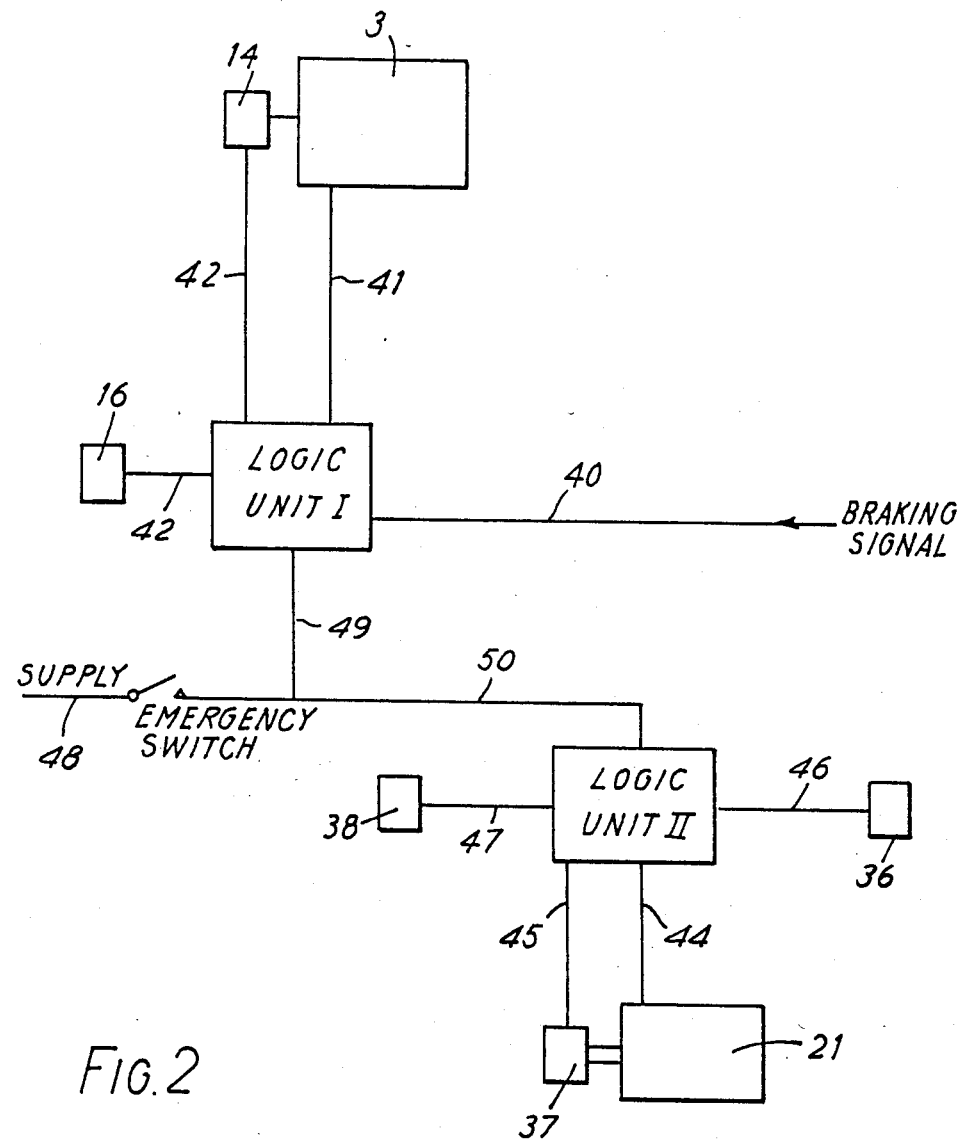

One embodiment of the present invention will now be described in greater detail, by way of example only, with reference to the accompanying drawings of which:

FIG. 1 is a longitudinal half-sectional view about the centre-line A—A of a tandem-arranged direct electric brake actuator and an electrically-operated spring-applied brake actuator, and FIG. 2 shows the electrical circuit for controlling the two actuators.

The braking system shown in the accompanying drawings and hereinafter described is a system for a railway vehicle but it will be understood that the present invention can be used for braking systems in other contexts or, indeed, for force-applying systems generally.

Referring to FIG. 1, the braking system includes a direct electric brake actuator 1 which is tandem-arranged with an electrically-operated spring-applied brake actuator 2.

Dealing, first, with the actuator 1, this comprises an electric motor 3 which, through gearing 4, drives a shaft 5. The shaft 5 is mounted in a bearing 6 of a housing 7 which carries the motor 3 and forms with a nut 8 a ball screw such that, upon operation of the motor 3, the shaft 5 is rotated to drive the nut 8 to the left as viewed in the drawing. A radial flange 9 on the nut 8 is engaged by one end of a heavy spring 10 the other end of which abuts an end-plate 11 of a spring-housing 12. Remote from the end-plate 11, the housing 12 has a radially-inwardly projecting flange 13 which engages over the flange 9 on the nut 8. The spring 10 is, therefore, retained within the housing 12 and held compressed between the end-plate 11 and the flange 9 on the nut 8.

Mounted on the motor 3 is an electrical locking brake 14.

The above described direct electric brake actuator 1 operates in the following manner:

The actuator 1 is shown in the "brake released" condition.

To apply the brake, the motor 3 is energised, through gearing 4 and shaft 5, to drive the nut 8 to the left as viewed in the drawing. Such movement of the nut 8 will carry with it the spring 10 and the spring housing 12.

This spring housing 12 is secured to one end of an output brake-force applying member 15 the other end of which is connected to the brake operated by the system. Hence, the member 15 will be moved with the housing 12 to bring the brake into engagement with the railway-vehicle wheel (both not shown).

As the motor 3 is continued to be operated, the member 15 and the spring housing 12 now being prevented from further movement by engagement of the brake with the wheel, the nut 8 will start further to compress the spring 10 and exert an increasing braking force.

To determine that the braking force exerted is that which is required the end-plate 11 is fitted with a strain gauge 16. Thus the force exerted through the spring 10 can be measured—by the strain gauge 16—by measuring the strain being exerted by the spring 10 on the end-plate 11. When the braking force being exerted is detected as being that required, the strain gauge 11 operates the electrical circuit of the system to energise the electric brake 14 to lock the actuator 1 and to switch off the motor 3.

The electrically-controlled spring-applied brake actuator 2 also has an electric motor 21 which, through gearing 22, is arranged to rotate an internally-threaded tube 23 mounted in a bearing 24 in a housing 25 on which is carried the motor 21. As will be seen from FIG. 1, the housing 25 is a onepiece construction with the housing 7 of the actuator 1.

The tube 23 is threaddedly engaged with an externally threaded tubular member 26 having at its end remote from its thread, a radial flange 27. Housed between this radial flange 27 and a radially inwardly projecting end wall 28 of the housing 25, is a brake-force applying spring 29.

The flange 27 has, towards its center, a conical face 30. A complementary conical face 31 is provided on a nut 32 which is threaddedly engaged with a reversible thread on a threaded portion 33 of the brake-force applying member 15 which, it will be seen, is common to both actuators 1 and 2. The flange 27 and the nut 32 thus constitute force transfer members of which the respective faces 30 and 31 constitute force transfer faces interengageable by movement of the nut 32 to the right (as viewed in FIG. 1).

The nut 32 can be moved to the right by a spring 34 which is tending to spin the nut 32 along the threaded portion 33 of the output member 15. To provide control of the nut 32, the nut has a leftward (as viewed in FIG. 1) tubular extension 35 which constitutes the armature of a solenoid 36.

Like actuator 1, the actuator 2 also has an electric locking brake 37 by which the shaft of the motor 21 can be locked to hold the tubular member 26 in any desired position.

The actuator 2 above described operates in the following manner:

In the brake released condition as shown in FIG. 1, the motor 21 has previously been operated to drive (through gearing 22 and tube 23) the tubular member 26 to the right as viewed in FIG. 1. This will have compressed the brake-force applying spring 29 which will have been and will continue to be held in that condition by energisation of the electric brake 37, which locks the tubular member 26 in the position shown in FIG. 1. After such locking, the motor 21 will have been de-energised.

Solenoid 36 will then have been energised to hold the nut 32 in its position shown in FIG. 1.

If, from this condition, a brake application is required, the solenoid 36 is first de-energised. This frees the spring 34 to spin the nut 32 up the threaded portion 33 of the output member 15 until its clutch face 31 engages the clutch face 30 in the tubular member 26. Shortly after the de-energisation of the solenoid 36, the electric braking 37 is also de-energised. This, in unlocking the tubular member 26, allows the brake-force applying spring 29 to extend and, through the engaged clutch faces 30 and 31 move the output member 15 to the left (as viewed in FIG. 1) to engage the brake with the vehicle wheel (both not shown). After such engagement, the spring 29 exerts a braking force on the brake.

The potential problem of the compounding of a "service brake application" effected with the actuator 1 with an "emergency brake application" effected with the actuator 2, is avoided with the above described equipment by an electrical circuit which ensures that the motor 3 and electric brake 14 of actuator 1 cannot be energised whilst the solenoid 36 and electric brake 37 of actuator 2 are de-energised.

Referring to FIG. 1, the actuator 2 further includes a micro-switch 38. This micro-switch is for the purpose of limiting the maximum applied braking force exerted by the spring 29 by limiting the compression of that spring. A suitable electric circuit to effect such control is shown in FIG. 2.

A circuit indicative of the required degree of braking is fed to Logic Unit I over line 40. Through the Logic Unit I, over line 41 the energisation of the motor 3 is controlled as is also, over line 42, the electric brake 14. The Logic Unit I is also fed, over the respective lines 42 and 43 by the strain gauge 16 with a feed-back signal indicative of the degree of force being exerted by the actuator 1. Hence, for a normal "service" brake operation, the Logic Unit I ensures the necessary degree of operation of the motor 3 and the control of the electric brake 14 to secure the degree of brake application or release called for by the input signal applied over line 40.

Another Logic Unit II similarly controls the motor 21 and its electric brake 37 over lines 44 and 45 respectively. Over line 46, the Logic Unit II controls the solenoid 36 and receives an input signal over line 47 from the micro-switch 38. A supply line 48 incorporates an Emergency Switch, the line feeding to both Logic Unit I over line 49 and the Logic Unit II over line 50. Closing of the Emergency Switch operates Logic Unit I to ensure that both the electric motor 3 of the actuator I and its locking brake 14 cannot be energised by an input signal over line 40 or, if already energised, are de-energised. Over line 50, closure of the Emergency Switch gives an input signal to the Logic Unit II to de-energise the solenoid 36 and the brake 37 and hold de-energised the motor 21. The maximum degree of braking permitted to be exerted by the actuator 2 is determined by the Logic Unit II upon operation of the micro-switch 38 feeding the Logic Unit II with an input signal over line 47.

I claim:

1. A force-applying system comprising a first, direct electric actuator including an electric motor and a second, electrically-controlled spring-applied actuator including a force-applying spring, and an output force-applying member, said apparatus further comprising a control solenoid and a force transfer means for providing operation of said output force-applying member of the second actuator, said force transfer means including a first force transfer member which is operatively loaded by the force-applying spring of the second actuator and a second force transfer member which is controlled by said solenoid such that when the solenoid is energized said second force transfer member is held out of engagement with said first force transfer member and when the solenoid is de-energized the first and second force transfer members are engaged to operatively to connect said force-applying spring to the output member, said system further comprising an electrical circuit means for controlling energization of the solenoid and the electric motor of the first actuator such that the electric motor of the first actuator is de-energized when the solenoid is de-energized.

2. A system as claimed in claim 1, wherein the output force-applying member is the sole force-applying member of the system and is common to both actuators so as to act as the output force-applying member of each actuator.

3. A system as claimed in claim 2, wherein the two actuators are mounted in tandem and the output force-applying member comprises a shaft which passes from the first actuator through the second actuator.

4. A system as claimed in claim 1, wherein the force transfer means includes two complementary conical surfaces of which one is carried by said first force transfer member and the other by said second force transfer member.

5. A system as claimed in claim 4, wherein said second force transfer member member comprises a nut threadedly engaged on the output member and loaded by a loading spring urging the nut in the direction of said first force transfer member to provide engagement between the two surfaces; the solenoid when energized holding the nut against the action of its spring from interengaging the two surfaces.

6. A system as claimed in claim 1, wherein the direct electric actuator comprises a force-applying spring the length of which is variable by operation of the electric motor of the direct electric actuator to vary the force exerted by the force-applying spring of the direct electric actuator on a force-applying member of the direct electric actuator.

7. A system as claimed in claim 6, wherein the direct electric actuator includes a control spring and the electric motor of the direct electric actuator is arranged to vary the length of the control spring of the direct electric actuator through a nut threadedly-engaged with a drive shaft, operation of the electric motor providing relative rotation between the nut and drive shaft in a direction tending to compress the control spring.

* * * * *